Jan. 30, 1934.   H. D'ALMAINE ET AL   1,945,028
REACTION TYPE SYNCHRONOUS MOTOR
Filed May 20, 1932   2 Sheets-Sheet 1
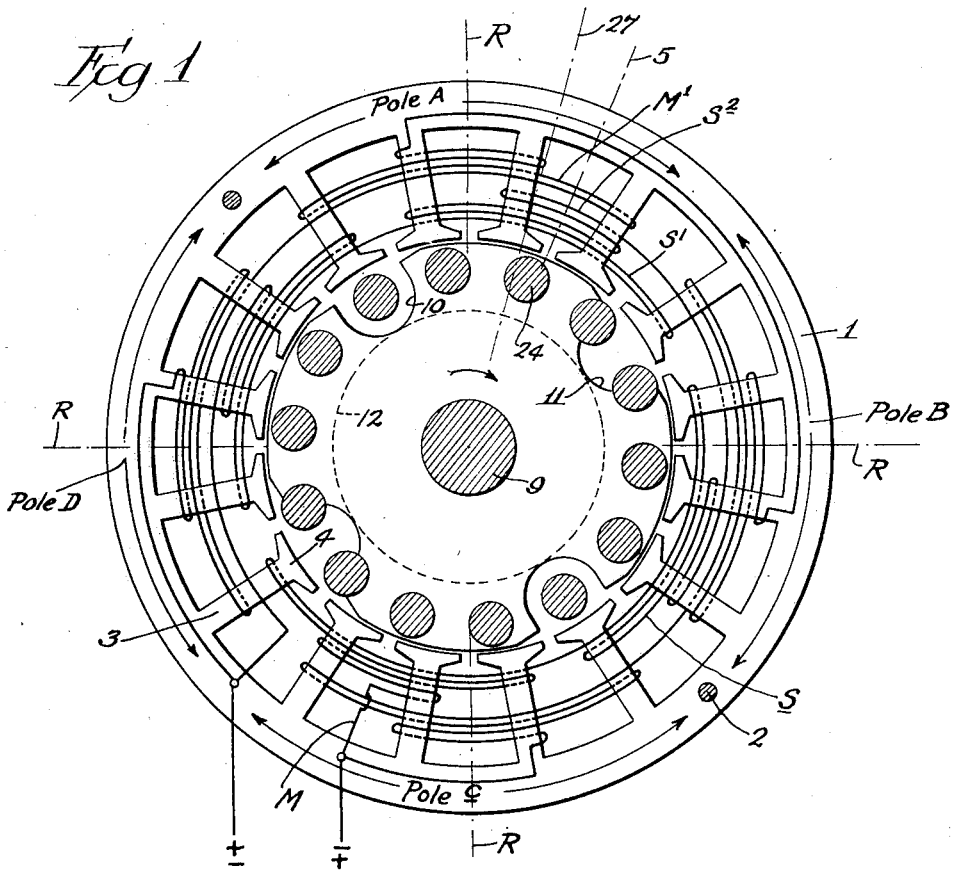
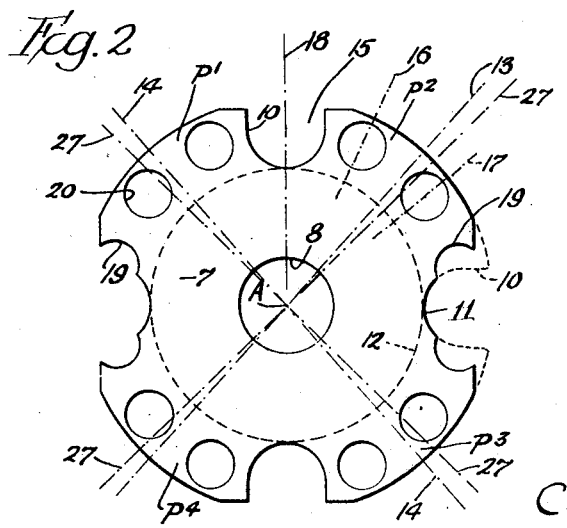
Inventors:
Harry D'Almaine and
Clifford F. Thompson
by Albert Scheib
Attorney

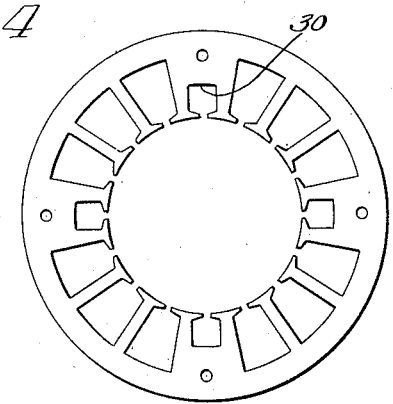
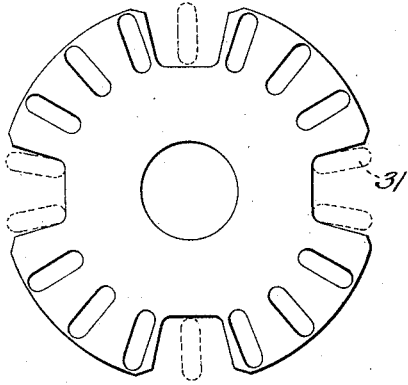
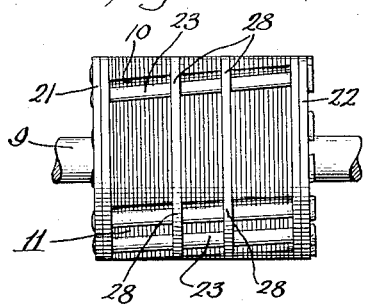
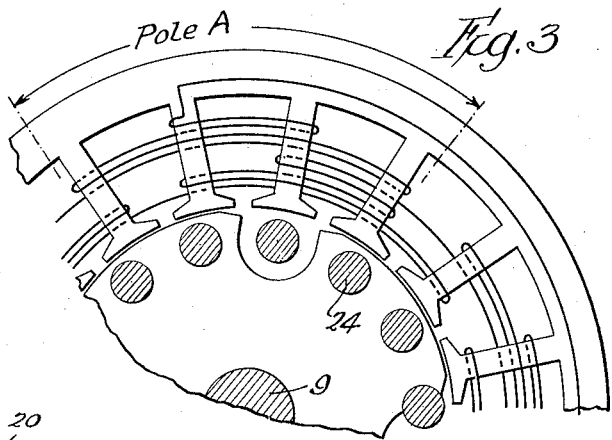
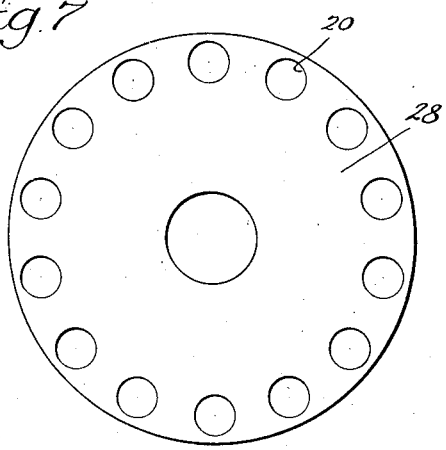

Patented Jan. 30, 1934

1,945,028

UNITED STATES PATENT OFFICE 1,945,028

REACTION TYPE SYNCHRONOUS MOTOR

Harry D'Almaine and Clifford F. Thompson, Chicago, Ill., assignors to Bodine Electric Co., Chicago, Ill., a corporation of Illinois Application May 20, 1932. Serial No. 612,473

13 Claims. (Cl. 172—278)

Our invention relates to synchronous alternating current motors and in its general objects aims to provide a motor of this class which will have an unusually high "over all" efficiency, and which can be manufactured easily and economically with an unusually small outside diameter of the stator in proportion to the power of the motor. Furthermore, our invention aims to provide a motor of this class which will have a strong torque, never dropping to zero at any position of the rotor, which can easily be built as a self-starting motor by merely adding a starting winding.

More particularly, our invention relates to motors of the recited class in which each pole of the stator is composed of a plurality of inwardly projecting teeth, and in this aspect aims to provide a highly efficient motor which will afford both a high torque and a compact radial size of the stator while permitting all of the stator teeth to be uniformly spaced counterparts of each other, and which can readily be built in a self-starting form without requiring the use of shading coils.

Generally speaking, we accomplish the above recited objects through the following provisions:

(1) By employing a main winding comprising winding sections each associated with all of the teeth of one pole and symmetrical with the axis of that pole, and a starting winding having each section thereof associated with the majority of the teeth of one pole and with a minority of the teeth of the next pole.

(2) By employing a rotor core presenting the same number of poles as those of the stator, but having the consecutive poles of the rotor alternately spaced by different distances.

(3) By employing a squirrel cage rotor having an even number of consecutively uniformly spaced rotor bars of a number which is not a multiple of the number of poles of the rotor.

(4) By disposing uniformly spaced rotor bars so that each rotor pole has a group of rotor bars extending through it and has this group of bars disposed unsymmetrically with respect to the radial medial plane of the rotor pole through which that group extends.

(5) By employing a rotor core having longitudinal slots dividing its radially outward portion into an even number of poles, together with rotor bars, part of which bars extend through the poles while other bars are disposed in the slots, with a different number of rotor bars in certain slots than in others.

(6) By providing means spaced from both ends of the rotor for preventing a buckling or bending of those rotor bars which extend within the slots during the assembling of the rotor.

(7) By employing a rotor having longitudinal slots dividing its radially outer portion into poles, together with rotor bars, part of which bars extend through poles while other bars are housed by slots, the number of bars housed by each slot being different from that housed by the next slot.

(8) By using a rotor core and rotor bar assembly as just recited, with the bar or group of bars in each slot symmetrically disposed with respect to the medial plane of the slot.

(9) By suitably proportioning the cross-sectional area of alternately different slots in a rotor in which the consecutive slots house a relatively different number of rotor bars.

(10) By displacing the magnetic centers of consecutive rotor poles in rotationally opposite directions from the mechanical centers of these poles, and displacing each starting winding section on the stator rearward of the direction of rotation of the rotor from the axes of the stator poles.

In its immediate commercial aspects, our invention is particularly suitable for four-pole motors of the single phase self-starting synchronous reaction type, in which the stator core and the rotor are each built up of counterpart laminations. Hence we are disclosing a corresponding embodiment in the following specification and in the accompanying drawings, from both of which further and more detailed objects of our invention will also appear.

In the drawings,

Fig. 1 is an enlarged transverse section through a motor embodying our invention, taken along the faces of alined stator and rotor laminations, with both a main winding and a starting winding shown diagrammatically and with the rotor in a position of maximum torque.

Fig. 2 is an elevation of a typical rotor core lamination.

Fig. 3 is a section similar to a portion of Fig. 1, but with the rotor in a position of minimum torque.

Fig. 4 is an elevation of a modified form of the stator lamination of Fig. 1, drawn on a reduced scale.

Fig. 5 is an elevation of a modified form of rotor lamination, drawn on the same scale as Fig. 1.

Fig. 6 is a reduced plan view of the rotor of Fig. 1.

Fig. 7 is an elevation of one of the unslotted laminations which prevent a buckling of the rotor bars housed by the slots of other laminations.

In the illustrated four-pole embodiment, the stator core comprises a plurality of counterpart laminations each consisting of an outer ring 1 (through which the usual bolts 2 extend for assembling the laminations into a rigid unit) and sixteen pole teeth 3 extending radially inward from this ring. These pole teeth are all counterparts of each other and uniformly spaced, and each pole tooth has its inner end widened to present a salient pole 4.

Associated with these teeth is a main winding M comprising four sections connected in series and each associated with a separate group of four consecutive teeth, so that these four groups of stator teeth form four consecutive poles respectively designated as A, B, C, and D in Fig. 1. The direction of this winding (which is shown diagrammatically in full lines in Fig. 1) is relatively reversed in each two consecutive groups of pole teeth, so that the consecutive poles will be of opposite polarity. The section of the main winding associated with each pole preferably consists of a winding portion $M^1$ extending around all four of the teeth of that pole, and an auxiliary portion $M^2$ extending around the two middle teeth so as to intensify the magnetization along the radial axis R of each pole.

When the motor is to be self-starting, we also provide a starting winding S (shown diagrammatically in Fig. 1), consisting of four consecutively reversed sections each associated with a separate group of four consecutive pole teeth, but this starting winding is displaced from the main winding in the opposite direction from that in which the rotor is to revolve. Thus, in Fig. 1, each section of the starting winding comprises a portion $S^1$ extending around the rotationally most rearward tooth of one stator pole B and also (in the same direction) around the forward three teeth of the next rearward stator pole A, together with a section $S^2$ extending only around the two most forward teeth of the stator pole A. The starting winding would of course be of higher resistance and lower reactance than the main winding, after the manner long customary in the stators of the single-phase motors, thereby affording a phase displacement between the currents flowing through the two windings when both are connected to the circuit (during the starting of the motor) as shown in Fig. 1.

Thus arranged, the flow of current through the main winding M alone will magnetize four groups of pole teeth, with the magnetic centers of the resulting consecutive four-tooth poles in radial planes R, which are at right angles to each other. However, current flowing through the secondary winding would alone energize the pole teeth to form poles with their magnetic centers in radial planes 5 shifted forwardly from the said planes. Consequently, the flow of current through both of the stator windings during the starting of the motor will produce a rotating magnetic field in a direction which will be clockwise in Fig. 1.

To cooperate effectively with a stator which is thus arranged to present four equally spaced and counterpart poles, we employ a squirrel cage rotor in which the poles of the rotor core are not consecutively of uniform spacing, in which the rotor bars are distributed and disposed in a novel manner, and in which the core is formed so as to afford a novel arrangement of paths of high and low magnetic reluctance between the rotor core and the poles of the stator.

As here shown, this rotor core consists of counterpart iron laminations 7 each having a central perforation 8 for slidably receiving the shaft 9 of the rotor. Each lamination has its circular periphery interrupted by two diametrically opposite and counterpart recesses 10, and also by two diametrically opposite and counterpart recesses 11, the common medial diametric plane of the recesses 10 being approximately at right angles to that of the recesses 11.

However, each recess 11 is wider than a recess 10, as indicated in dotted lines at the right-hand side of Fig. 2, desirably to such an extent that the thus formed four rotor poles (namely the portions radially outward of an imaginary circle 12 tangential of the bottoms of all four of the recesses) have pole faces of substantially an equal circumferential length corresponding approximately to 75 percent of the width of a stator pole.

Owing to this difference in the width of the alternate slots, each rotor pole is spaced by unequal distances from the two other poles between which it is interposed, and the radial plane 14 through the mechanical centers of two opposite rotor poles $P^1$ and $P^3$ is not at right angles to the radial plane 13 through the mechanical centers of the other two diametrically opposite poles $P^2$ and $P^4$.

Each of the laminations has every one of its said pole-forming portions provided with two bar-receiving perforations of equal diameter, the centers of all of these bar-receiving perforations being at the same distance from the axis of the central (shaft-receiving) perforation 8. The centers of the two perforations in each pole-forming portion being in planes radial of the rotor lamination, which planes 16 and 17 are spaced from the medial radial plane of the adjacent narrower slot 10 by different angles, which here are respectively 1/14 and 1/7 of 360 degrees.

Furthermore, we desirably provide each side wall of each wider slot with a recess 19 formed as an arc of the same radius as the bar-receiving perforations 20 in each rotor pole portion of the lamination, each such arc having its center at the same distance from the axis A of the lamination as the centers of the perforations 20, and having this center in a plane radial of the lamination and spaced from the said medial plane 18 of the nearest narrow slot 10 by an angle corresponding to 3/14 of 360 degrees.

These rotor laminations are assembled on the rotor shaft 9 in the usual manner between short-circuiting rings 21 and 22. When the rotor laminations and the short-circuiting rings are turned so as to aline the lamination poles with each other, and also to aline the pole perforations 20 with perforations in the rings, the edge notches 10 and 11 respectively form pairs of longitudinal slots in the peripheral surface of the rotor core, thereby forming four rotor poles; after which the assembler slides rotor bars 23 through the alined ring perforations and the interposed core portions, the number of these rotor bars being an even number which is not a multiple of the number of rotor poles. With the total number of bars 14 and the rotor poles four in number (as here illustrated), this assembling causes two of the rotor bars to be housed by each rotor pole, disposes one rotor bar centrally in each narrower slot 10, and disposes two rotor bars in each wider slot 11 with each of these bars engaging arcuate slot-wall recesses 19. After the rotor bars have all been inserted, the assembly is preferably skewed in the usual manner before these bars are headed over the outer faces of the short-circuiting rings to clinch the assembly.

The assembled motor exhibits unusual characteristics, due to the unsymmetrical distribution of the rotor bars with respect to the rotor poles, the unsymmetrical distribution of the iron in each rotor pole, the fact that the number of rotor bars is not a multiple of the number of rotor poles, and the unusual depth of the slots between consecutive rotor poles. This depth is here shown as approximately 30 percent of the radius of the rotor core, but may range from a minimum of 20 to a maximum of 50 percent of the length of the said radius.

Thus, with fourteen bars on a four-pole rotor, two diametrically opposite bars can each be disposed in one of the narrow slots, but the bars extending through each pole cannot be disposed symmetrically with respect to the mechanical axis of the pole when the bars in the two slots at opposite sides of this pole are symmetrically disposed with respect to the medial planes of slots of different width. Consequently, the magnetic center 27 of each rotor pole is shifted rotationally from the mechanical center line (13 or 14) of the pole, this shifting being toward the adjacent wider slot.

Since this shifting is in opposite directions in the two poles spaced by each wider slot, the shifting in the two consecutive poles tends to rotate the rotor in opposite directions. Consequently, the rotor is decidedly unstable when only the main winding of the stator is excited, and the tendency of the rotor to lock in certain positions with respect to the stator is reduced so that we obtain a corresponding increase in the starting torque.

As the result of the heretofore recited combined features, we obtain a positive torque during all rotational positions of the rotor; namely one which never drops to zero even in the minimum torque position of Fig. 1, and which reaches its maximum in the position shown in Fig. 3.

However, while we have here illustrated an embodiment of our invention in which the rotor and the stator each have four poles, in which each stator pole comprises four pieces, and in which 14 rotor bars are distributed so as to dispose a single bar in each of two narrow slots and two bars in each of two wider slots, we do not wish to be limited in these respects. In practice, the number of pairs of poles in both the stator and the rotor may be varied, as also the number of teeth in each stator pole.

When the rotor bars are formed of rather soft copper, to facilitate the forming of heads on these bars after they have been inserted, the heading operation may buckle or bend those bars which extend within the recesses. To avoid this, we desirably also provide a small number of unrecessed laminations 28, spaced from each other and from the ends of the core, each of which has a bar receiving perforation for every one of the rotor bars. Thus positioned, as in Fig. 6, each of the unrecessed laminations presents a portion extending across each slot in the rotor, and the interfitting of these portions with the slot-housed rotor bars prevents these bars from buckling or bending. With relatively few of these buckle-preventing lamitations the operation and efficiency of the motor is unaffected by their use.

The number of rotor bars can also be varied, provided that these are of even number which is not a multiple of the number of poles; and the number of bars within the slots can also be varied, provided that those at opposite sides of each rotor pole are respectively of an odd and an even number, and the relative rotational displacement of the mechanical and magnetic centers of each rotor pole may also vary considerably, as for example by angles ranging from one degree to about five degrees.

Nor do we wish to be limited as to the illustrated depth of the slots or the free spacing of certain rotor bars, although we have found this desirable because the resulting air space around these bars increases the magnetic reluctance opposite them. Indeed, many changes might obviously be made without departing either from the spirit of our invention or from the appended claims.

For example, the slot 30 between each of the middle two polepieces forming a stator pole may be decreased in depth, as shown in Fig. 4. Likewise, the slots in the rotor may be straight-sided as shown in Fig. 5 and the rotor bars 31 may be of a flat type as also shown in that figure.

We claim as our invention:

1. A squirrel cage rotor including a rotor core provided on its peripheral surface with four longitudinal surface slots; and a plurality of rotor bars of uniform spacing mounted on the core, the majority of the bars entirely housed by the core and the remainder being disposed in the said slots, the number of slot-housed bars being equal in each of two diametrically opposite slots but different from the number housed by each of the other slots.

2. A rotor for an alternating current motor, comprising a rotor core provided with four longitudinal surface slots, and a plurality of rotor bars of uniform spacing mounted on the core, the majority of the bars entirely housed by the core and the remainder being disposed in the said slots; the bars being so disposed with respect to the core that each of two diametrically opposite slots freely houses an even number of bars, and that each of the other two slots houses an uneven number of rotor bars.

3. An alternating current rotor as per claim 2, in which each of the said other rotor core slots houses a single rotor bar which is equally spaced from the side walls of the slot.

4. An alternating current rotor as per claim 2, in which each slot has a cross-sectional area not less than 25 percent nor more than 125 percent of the cross-sectional area of each of the poles between which the slot is interposed.

5. An alternating current rotor as per claim 2, in which each slot has a depth not less than one-fifth nor more than one-half the length of the radius of the rotor core.

6. In a squirrel cage rotor, an iron core exteriorly formed to present an even number of pole pieces; and uniformly spaced rotor bars including groups of bars extending respectively through the pole pieces, and other bars extending through spaces between consecutive pole pieces; each of the said groups being displaced rotationally of the pole piece through which it extends, from the mechanical center of the pole piece, and the direction of this displacement being in opposite directions in each two consecutive pole pieces.

7. A squirrel cage rotor as per claim 6, in which the extent of the said displacement is not less than one degree and not more than five degrees angularly about the axis of the rotor.

8. A squirrel cage rotor comprising a symmetrical multipolar-core having each pole-piece thereof spaced by different distances from the two pole-pieces between which it is interposed; and rotor bars part of which extend in the spaces between consecutive pole-pieces while others are completely housed by the pole-pieces; the rotor bars being uniformly spaced circumferentially of the rotor core and distributed so that the center of the group of bars completely housed by each pole-piece is displaced rotationally of the core from the mechanical center of that pole-piece, this displacement being in opposite directions in each two consecutive pole-piece.

9. A squirrel cage rotor comprising two alined short-circuiting rings, a core composed of alined iron laminations and spacing the said rings, and rotor bars connecting the rings; the major portion of the laminations being of a counterpart formation presenting edge recesses which aline in these laminations to afford slots extending longitudinally of the rotor, each of which slots houses at least one of the rotor bars; the core also including at least one other lamination spaced from the ends of the core and presenting portions which extend across the said slots and present perforations through which the slot-housed rotor bars slidably extend, all of the laminations having alined perforations through which rotor bars not housed by the slots extend.

10. In an alternating current motor, a multipolar stator core having each pole-piece thereof composed of a plurality of pole-teeth, with groups of consecutive pole-teeth respectively forming counterpart pole-pieces; a main winding comprising sections each associated with all teeth of one pole-piece and centered with respect to that pole-piece, and a starting winding comprising sections each associated with only the rotationally most rearward tooth of one group and all but the most rearward tooth of the next rotationally rearward group of teeth; all pole-teeth of the stator core being counterparts of one another, uniformly spaced, and included in the said groups of pole-teeth.

11. In an alternating current motor, a stator core comprising a generally ring-shaped member provided with inwardly extending counterpart pole teeth and presenting slots of equal width and shape between consecutive teeth, the total number of pole teeth being an even multiple of at least two pairs of teeth; and a stator winding having sections thereof each associated with pole teeth groups each of which consists of at least two adjacent pairs of teeth; the slot between the middle pair of teeth of each group being of less radial depth than the slots between the other teeth so as to enhance the magnetization at the center of the pole conjointly formed by that group of teeth.

12. In an alternating current motor, a stator having four equally spaced and counterpart pole-pieces; and a generally cylindrical rotor core having two pairs of diametrically opposite longitudinal slots opening at its peripheral surface, the slots being arranged so that the motor presents four rotor pole-pieces of substantially equal pole face width; the slots of one pair being wider than those of the other pair; and rotor bars extending longitudinally of the core and supported by the core, the bars being of an even number not a multiple of four; a plurality of the bars extending longitudinally through and being completely housed by each pole-piece of the core, the rotor bars being uniformly spaced and all at the same distance from the axis of the core; the spacing of each slot from the nearest completely housed rotor bar being less for the walls of the narrower slots than for the walls of the wider slots.

13. In a squirrel cage rotor, a core comprising counterpart iron laminations provided with edge recesses, the laminations being disposed so that their recesses aline to constitute surface slots extending longitudinally of the core, and a smaller number of unrecessed laminations each interposed between recessed laminations; two short-circuiting rings respectively engaging opposite ends of the core; and rotor bars of non-magnetic material connecting the said rings and extending through the unrecessed laminations; the majority of the rotor bars extending through portions of the edge-recessed laminations between recesses in these laminations, and the remainder of the rotor bars having portions thereof housed by the said slots.

HARRY D'ALMAINE.
CLIFFORD F. THOMPSON.